(12) United States Patent
Komiya

(10) Patent No.: US 7,933,857 B2
(45) Date of Patent: Apr. 26, 2011

(54) TRANSLATOR SUPPORT SYSTEM, SERVER, METHOD AND RECORDING MEDIUM

(75) Inventor: Shiho Komiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 993 days.

(21) Appl. No.: 11/105,364

(22) Filed: Apr. 14, 2005

(65) Prior Publication Data
US 2005/0234702 A1 Oct. 20, 2005

(30) Foreign Application Priority Data
Apr. 14, 2004 (JP) .................................. 2004-119228

(51) Int. Cl.
G06F 15/18 (2006.01)
G06F 15/00 (2006.01)
(52) U.S. Cl. .................................. 706/62; 704/7; 710/62
(58) Field of Classification Search .................. 704/2, 7, 704/209; 710/62; 706/62
See application file for complete search history.

(56) References Cited

U.S. PATENT DOCUMENTS

| 6,263,212 B1 * | 7/2001 | Ross et al. ..................... 455/466 |
| 6,507,812 B1 * | 1/2003 | Meade et al. ....................... 704/8 |
| 2004/0243403 A1 * | 12/2004 | Matsunaga et al. ............ 704/209 |
| 2006/0277332 A1 * | 12/2006 | Yamashina ...................... 710/62 |

FOREIGN PATENT DOCUMENTS

| JP | H8-501166 | 2/1996 |
| JP | 2001-344237 | 12/2001 |
| WO | WO 94/06086 | 3/1994 |

\* cited by examiner

Primary Examiner — Donald Sparks
Assistant Examiner — Kalpana Bharadwaj
(74) Attorney, Agent, or Firm — Morrison & Foerster LLP

(57) ABSTRACT

A server having a database sequentially registers a plurality of Japanese messages to be translated into the database. In parallel to the registration, the server provides a first translation terminal with Japanese messages already registered, acquires English messages translated by the first translation terminal, and sequentially registers the acquired English messages in the database in association with corresponding Japanese messages. In parallel to the processes, the server provides individual second translation terminals with English messages already registered, acquires multilingual messages translated by the second translation terminals, and sequentially registers the acquired multilingual messages in the database in association with corresponding English messages.

12 Claims, 13 Drawing Sheets

FIG. 6

Reference of translation   *:required item

| Reference of translation | |
|---|---|
| System ID | 000038 |
| Complete Translation | Select a cabinet. |
| Fix * | キャビネットを選択してください。（最大表示イメージ）<br>Select a cabinet. (18 bytes)<br>Select a cabinet.<br>Please input a term used with a screen. |
| Terminology * | キャビネットを選択してください。<br>Select a cabinet.<br>Please input a terminology (example, use) |
| Maximum bytes | 255 bytes |

- 61
- 62
- 63
- 64
- 65

Last update account: shino-k
Last update time: 12/09/2003 18:15:16

[close]

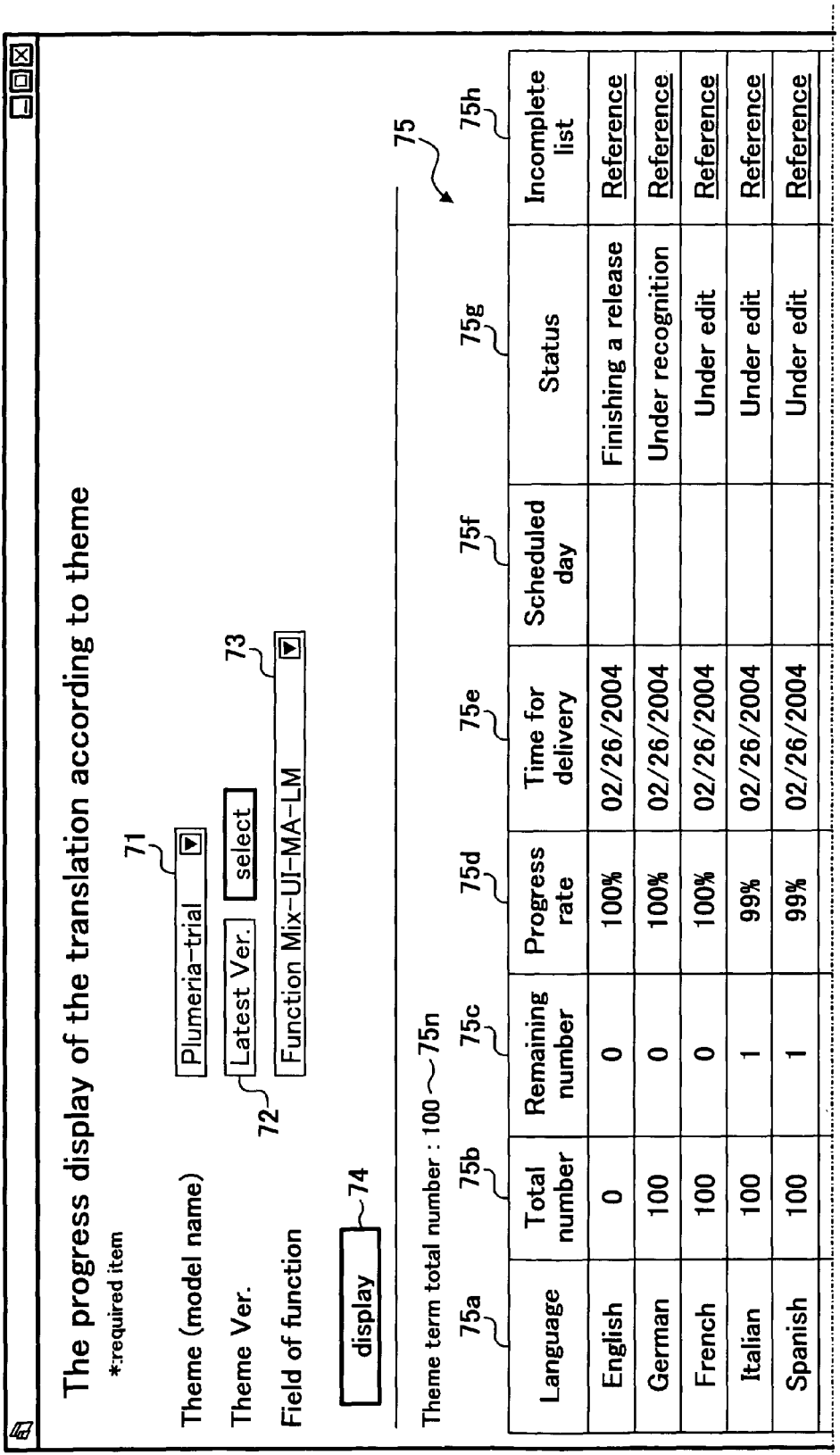

FIG. 7B

| | | | | | |
|---|---|---|---|---|---|
| Dutch | 100 | 1 | 99% | 02/26/2004 | Under edit | Reference |
| Swedish | 100 | 1 | 99% | 02/26/2004 | Under edit | Reference |
| Danish | 100 | 1 | 99% | 02/26/2004 | Under edit | Reference |
| Norwegian | 100 | 1 | 99% | 02/26/2004 | Under edit | Reference |
| Polish | 100 | 1 | 99% | 02/26/2004 | Under edit | Reference |
| Portuguese | 100 | 1 | 99% | 02/26/2004 | Under edit | Reference |
| Croatian | 100 | 100 | 0% | 02/26/2004 | | Reference |
| Hungarian | 100 | 1 | 99% | 02/26/2004 | Under edit | Reference |
| Finnish | 100 | 1 | 99% | 02/26/2004 | Under edit | Reference |
| Russian | 100 | 100 | 0% | 02/26/2004 | | Reference |

FIG. 8

Search of a theme term & Display of a result
*:required item

- Theme (model name): Plumeria-trial — 81
- Field of function: Function Mix-UI-MA-LM — 82
- Language: Russian — 83
- Fix: — 84
- Term ID: — 85
- System ID: — 86
- Status: ☑ Incomplete ☐ Edit ☐ Examination/recognition ☐ Release — 87
- Page number: 1 — 88

[Search] — 89

Number of lists: 20 — 90n

90 ↘

| Term ID | System ID | Status | Language | Variation | Fix | Terminology | update date | Edition |
|---|---|---|---|---|---|---|---|---|
| FPC1A0010 0450 | D00037 | Incomplete | RUS | ORG. | | | 11/26/2003 17:09:15 | edition |
| FPC1A0010 0460 | D00038 | Incomplete | RUS | ORG. | | | 11/26/2003 17:09:15 | edition |
| FPC1A0010 0470 | D00039 | Incomplete | RUS | ORG. | | | 11/26/2003 17:09:15 | edition |
| FPC1A0010 0480 | D00040 | Incomplete | RUS | ORG. | | | 11/26/2003 17:09:15 | edition |
| FPC1A0010 0490 | D00041 | Incomplete | RUS | ORG. | | | 11/26/2003 17:09:15 | edition |
| FPC1A0010 0500 | D00009 | Incomplete | RUS | ORG. | | | 11/26/2003 17:09:15 | edition |
| FPC1A0010 0510 | D00042 | Incomplete | RUS | ORG. | | | 11/26/2003 17:09:15 | edition |
| FPC1A0010 0520 | D00043 | Incomplete | RUS | ORG. | | | 11/26/2003 17:09:15 | edition |

90a  90b  90c  90d  90e  90f  90g  90h  90i

[check all]

TRANSLATOR SUPPORT SYSTEM, SERVER, METHOD AND RECORDING MEDIUM

BACKGROUND OF THE INVENTION

1. Field of the Invention

The present invention relates to a translation support system which supports a translation work, and, more particularly, to a translation support system, a server, a translation support method, and a recording medium, which can adequately support a sequence of translation works at the time of translating one language to another through a plurality of languages.

2. Description of the Related Art

There is a translation support system known which supports a translation work. For example, Japanese National Publication No. H8-501166 discloses a technique which restricts a vocabulary to eliminate ambiguity of texts to improve the precision of machine translation. Unexamined Japanese Patent Application KOKAI Publication No. 2001-344237 discloses a technique which encodes the mode or so of a descriptive portion in a text and translates it in multiple languages.

Those techniques are adapted not only to translation of books and documents or the like, but also to translation of various display messages (display information or the like) on products having display sections. An OA (Office Automation) apparatus, for example, has messages (terms and texts) or the like to explain operation procedures displayed on a display section (liquid crystal display section or the like). If such a message is translated according to a country or an area where the OA apparatus is to be sold, an OA apparatus adaptable worldwide can be used in each country without modifying the hardware of the OA apparatus.

As one example, Japanese makers generally employ procedures of translating a Japanese message (original language or original text) into an English message (equivalent or translated text), then translating the English message to other foreign language messages or multilingual messages (individual equivalent or translated texts).

When one language is translated to multiple languages step by step, however, the overall translation takes time and involves a troublesome work.

In specifically translating messages for an OA apparatus, the first translator translates Japanese messages into English messages in approximately one month. Then, the translated English messages are given to respective translators who in turn translate the English messages into messages in other languages in about three months. That is, the overall translation alone needs about four months.

To make such translated messages displayable on OA apparatuses, the messages should be converted to, for example, the CSV (Comma Separated Value) format before being input to the OA apparatuses.

Adequately displaying messages on a display section should clear a restriction on the length of words (the maximum number of characters or so) due to the size of the display area or the like. When a translated message exceeds the maximum number of characters, an additional correction work of, for example, adequately shortening the message is needed.

SUMMARY OF THE INVENTION

Accordingly, it is an object of the invention to provide a translation support system, a server, a translation support method, a recording medium and a carrier wave, which can adequately support a sequence of translation works to smoothly and quickly accomplish translation of one language to a plurality of languages.

To achieve the object, according to the first aspect of the invention, there is provided a translation support system in which a server having a database, a first terminal and a second terminal are connected together via a predetermined network, and the server comprises:

an original registering section which sequentially registers a plurality of original messages to be translated into the database;

a specific translation acquiring section which provides the first terminal with individual original messages having been registered in the original registering section in a referable manner, and acquires a specific translated message, translated into a specific language, sent from the first terminal;

a specific translation registering section which sequentially registers specific translated messages acquired by the specific translation acquiring section into the database in association with the original messages to be translated;

a prescribed translation acquiring section which provides the second terminal with individual specific translated messages having been registered in the specific translation registering section in a referable manner, and acquires a prescribed translated message, translated into a prescribed language, sent from the second terminal; and a prescribed translation registering section which sequentially registers prescribed translated messages acquired by the prescribed translation acquiring section into the database in association with specific translated messages to be translated, wherein the first terminal displays an original message supplied from the server and transmits a specific translated message translated into a specific language to the server, and the second terminal displays a specific translated message supplied from the server and transmits a prescribed translated message translated into a prescribed language to the server.

According to the invention, the original registering section of the server sequentially registers a plurality of original messages (e.g., Japanese messages) to be translated into the database. The specific translation acquiring section provides the first terminal with individual original messages having been registered in the original registering section in a referable manner, and acquires a specific translated message (e.g., an English message), translated into a specific language, sent from the first terminal. The specific translation registering section sequentially registers specific translated messages acquired by the specific translation acquiring section into the database in association with the original messages to be translated. The prescribed translation acquiring section provides the second terminal with individual specific translated messages having been registered in the specific translation registering section in a referable manner, and acquires a prescribed translated message, translated into a prescribed language, sent from the second terminal. The prescribed translation registering section sequentially registers prescribed translated messages acquired by the prescribed translation acquiring section into the database in association with specific translated messages to be translated. The first terminal displays an original message supplied from the server and transmits a specific translated message translated into a specific language to the server, and the second terminal displays a specific translated message supplied from the server and transmits a prescribed translated message translated into a prescribed language to the server.

As registration of an original text, translation and registration of a specific translation text, and translation and registration of a prescribed translation text are executed in parallel, a sequence of translation works progresses smoothly and quickly. This can adequately support a sequence of translation works.

In the translation support system, a plurality of second terminals may each be connected to the server, and the prescribed translation acquiring section may provide the second terminals with respective registered specific translated messages in a referable manner, and acquire prescribed translated messages, translated into different languages, sent from the second terminals.

The original registering section may add meaning data indicative of a meaning of an original message to the original message, and register the meaning-data added original message in the database, and the specific translation registering section may add meaning data indicative of a meaning of a specific translated message to the specific translated message, and register the meaning-data added specific translated message in the database.

The specific translation acquiring section may compute a maximum length defined according to a message type, and request the first terminal to resend a shorter specific translated message when a specific translated message sent from the first terminal is longer than the computed maximum length, and the prescribed translation acquiring section may compute a maximum length defined according to a message type, and request the second terminal to resend a shorter prescribed translated message when a prescribed translated message sent from the second terminal is longer than the computed maximum length.

The server may further comprise a retrieval section which retrieves a set of an original message and a specific translated message or a set of a specific translated message and a prescribed translated message from the database in response to a retrieval request sent from the first terminal or the second terminal, and send reference data including both messages retrieved to the first terminal or the second terminal whichever has requested retrieval.

The server may further comprise a conversion section which converts messages, registered in the database by the original registering section, the specific translation registering section and the prescribed translation registering section, into predetermined formats.

The server may further comprise a progress managing section which counts numbers of messages respectively from the specific translation registering section and the prescribed translation registering section registered in the database, and manage a progress status of each translation or a progress status of a series of translations.

To achieve the object, according to the second aspect of the invention, there is provided a translation support system in which a server having a database, a first terminal and a second terminal are connected together via a predetermined network, and the server comprises:

original registering means for sequentially registering a plurality of original messages to be translated into the database;

specific translation acquiring means for providing the first terminal with individual original messages having been registered in the original registering means in a referable manner, and acquiring a specific translated message, translated into a specific language, sent from the first terminal;

specific translation registering means for sequentially registering specific translated messages acquired by the specific translation acquiring means into the database in association with the original messages to be translated;

prescribed translation acquiring means for providing the second terminal with individual specific translated messages having been registered in the specific translation registering means in a referable manner, and acquiring a prescribed translated message, translated into a prescribed language, sent from the second terminal; and prescribed translation registering means for sequentially registering prescribed translated messages acquired by the prescribed translation acquiring means into the database in association with specific translated messages to be translated, wherein the first terminal displays an original message supplied from the server and transmits a specific translated message translated into a specific language to the server, and the second terminal displays a specific translated message supplied from the server and transmits a prescribed translated message translated into a prescribed language to the server.

According to the invention, the original registering means of the server sequentially registers a plurality of original messages (e.g., Japanese messages) to be translated into the database. The specific translation acquiring means provides the first terminal with individual original messages having been registered in the original registering means in a referable manner, and acquires a specific translated message (e.g., an English message), translated into a specific language, sent from the first terminal. The specific translation registering means sequentially registers specific translated messages acquired by the specific translation acquiring means into the database in association with the original messages to be translated. The prescribed translation acquiring means provides the second terminal with individual specific translated messages having been registered in the specific translation registering means in a referable manner, and acquires a prescribed translated message, translated into a prescribed language, sent from the second terminal. The prescribed translation registering means sequentially registers prescribed translated messages acquired by the prescribed translation acquiring means into the database in association with specific translated messages to be translated. The first terminal displays an original message supplied from the server and transmits a specific translated message translated into a specific language to the server, and the second terminal displays a specific translated message supplied from the server and transmits a prescribed translated message translated into a prescribed language to the server.

As registration of an original text, translation and registration of a specific translation text, and translation and registration of a prescribed translation text are executed in parallel, a sequence of translation works progresses smoothly and quickly. This can adequately support a sequence of translation works.

To achieve the objects, according to the third aspect of the invention, there is provided a server connected to a first terminal and a second terminal via a predetermined network, and comprising:

a database;

an original registering section which sequentially registers a plurality of original messages to be translated into the database;

a specific translation acquiring section which provides the first terminal with individual original messages having been registered in the original registering section in a referable manner, and acquires a specific translated message, translated into a specific language, sent from the first terminal;

a specific translation registering section which sequentially registers specific translated messages acquired by the specific translation acquiring section into the database in association with the original messages to be translated;

a prescribed translation acquiring section which provides the second terminal with individual specific translated messages having been registered in the specific translation registering section in a referable manner, and acquires a prescribed translated message, translated into a prescribed language, sent from the second terminal; and a prescribed translation registering section which sequentially registers prescribed translated messages acquired by the prescribed translation acquiring section into the database in association with specific translated messages to be translated.

According to the invention, the original registering section sequentially registers a plurality of original messages (e.g., Japanese messages) to be translated into the database. The specific translation acquiring section provides the first terminal with individual original messages having been registered in the original registering section in a referable manner, and acquires a specific translated message (e.g., an English message), translated into a specific language, sent from the first terminal. The specific translation registering section sequentially registers specific translated messages acquired by the specific translation acquiring section into the database in association with the original messages to be translated. The prescribed translation acquiring section provides the second terminal with individual specific translated messages having been registered in the specific translation registering section in a referable manner, and acquires a prescribed translated message, translated into a prescribed language, sent from the second terminal. The prescribed translation registering section sequentially registers prescribed translated messages acquired by the prescribed translation acquiring section into the database in association with specific translated messages to be translated.

As registration of an original text, translation and registration of a specific translation text, and translation and registration of a prescribed translation text are executed in parallel, a sequence of translation works progresses smoothly and quickly. This can adequately support a sequence of translation works.

A plurality of second terminals may each be connected to the server, and the prescribed translation acquiring section may provide the second terminals with respective registered specific translated messages in a referable manner, and acquire prescribed translated messages, translated into different languages, sent from the second terminals.

The original registering section may add meaning data indicative of a meaning of an original message to the original message, and register the meaning-data added original message in the database, and the specific translation registering section may add meaning data indicative of a meaning of a specific translated message to the specific translated message, and register the meaning-data added specific translated message in the database.

The specific translation acquiring section may compute a maximum length defined according to a message type, and request the first terminal to resend a shorter specific translated message when a specific translated message sent from the first terminal is longer than the computed maximum length, and the prescribed translation acquiring section may compute a maximum length defined according to a message type, and request the second terminal to resend a shorter prescribed translated message when a prescribed translated message sent from the second terminal is longer than the computed maximum length.

The server may further comprise a retrieval section which retrieves a set of an original message and a specific translated message or a set of a specific translated message and a prescribed translated message from the database in response to a retrieval request sent from the first terminal or the second terminal, and sends reference data including both messages retrieved to the first terminal or the second terminal whichever has requested retrieval.

The server may further comprise a conversion section which converts messages, registered in the database by the original registering section, the specific translation registering section and the prescribed translation registering section, into predetermined formats.

The server may further comprise a progress managing section which counts numbers of messages respectively from the specific translation registering section and the prescribed translation registering section registered in the database, and manages a progress status of each translation or a progress status of a series of translations.

To achieve the objects, according to the fourth aspect of the invention, there is provided a server connected to a first terminal and a second terminal via a predetermined network, and comprising:

a database;

original registering means for sequentially registering a plurality of original messages to be translated into the database;

specific translation acquiring means for providing the first terminal with individual original messages having been registered in the original registering means in a referable manner, and acquiring a specific translated message, translated into a specific language, sent from the first terminal;

specific translation registering means for sequentially registering specific translated messages acquired by the specific translation acquiring means into the database in association with the original messages to be translated;

prescribed translation acquiring means for providing the second terminal with individual specific translated messages having been registered in the specific translation registering means in a referable manner, and acquiring a prescribed translated message, translated into a prescribed language, sent from the second terminal; and prescribed translation registering means for sequentially registering prescribed translated messages acquired by the prescribed translation acquiring means into the database in association with specific translated messages to be translated.

According to the invention, the original registering means sequentially registers a plurality of original messages (e.g., Japanese messages) to be translated into the database. The specific translation acquiring means provides the first terminal with individual original messages having been registered in the original registering means in a referable manner, and acquires a specific translated message (e.g., an English message), translated into a specific language, sent from the first terminal. The specific translation registering means sequentially registers specific translated messages acquired by the specific translation acquiring means into the database in association with the original messages to be translated. The prescribed translation acquiring means provides the second terminal with individual specific translated messages having been registered in the specific translation registering means in a referable manner, and acquires a prescribed translated message, translated into a prescribed language, sent from the second terminal. The prescribed translation registering means sequentially registers prescribed translated messages acquired by the prescribed translation acquiring means into the database in association with specific translated messages to be translated.

As registration of an original text, translation and registration of a specific translation text, and translation and registration of a prescribed translation text are executed in parallel, a sequence of translation works progresses smoothly and quickly. This can adequately support a sequence of translation works.

To achieve the objects, according to the fifth aspect of the invention, there is provided a translation support method in a server having a database and connected to a first terminal and a second terminal via a predetermined network, comprising:

an original registering step of sequentially registering a plurality of original messages to be translated into the database;

a specific translation acquiring step of providing the first terminal with individual original messages having been registered in the original registering section in a referable manner, and acquiring a specific translated message, translated into a specific language, sent from the first terminal;

a specific translation registering step of sequentially registering specific translated messages acquired by the specific translation acquiring section into the database in association with the original messages to be translated;

a prescribed translation acquiring step of providing the second terminal with individual specific translated messages having been registered in the specific translation registering section in a referable manner, and acquiring a prescribed translated message, translated into a prescribed language, sent from the second terminal; and a prescribed translation registering step of sequentially registering prescribed translated messages acquired by the prescribed translation acquiring section into the database in association with specific translated messages to be translated.

According to the invention, the original registering step sequentially registers a plurality of original messages (e.g., Japanese messages) to be translated into the database. The specific translation acquiring step provides the first terminal with individual original messages having been registered in the original registering step in a referable manner, and acquires a specific translated message (e.g., an English message), translated into a specific language, sent from the first terminal. The specific translation registering step sequentially registers specific translated messages acquired by the specific translation acquiring step into the database in association with the original messages to be translated. The prescribed translation acquiring step provides the second terminal with individual specific translated messages having been registered in the specific translation registering step in a referable manner, and acquires a prescribed translated message, translated into a prescribed language, sent from the second terminal. The prescribed translation registering step sequentially registers prescribed translated messages acquired by the prescribed translation acquiring step into the database in association with specific translated messages to be translated.

As registration of an original text, translation and registration of a specific translation text, and translation and registration of a prescribed translation text are executed in parallel, a sequence of translation works progresses smoothly and quickly. This can adequately support a sequence of translation works.

To achieve the objects, according to the sixth aspect of the invention, there is provided a computer readable recording medium having recorded a program for allowing a computer to execute a translation support method comprising:

an original registering step of sequentially registering a plurality of original messages to be translated into the database;

a specific translation acquiring step of providing the first terminal with individual original messages having been registered in the original registering section in a referable manner, and acquiring a specific translated message, translated into a specific language, sent from the first terminal;

a specific translation registering step of sequentially registering specific translated messages acquired by the specific translation acquiring section into the database in association with the original messages to be translated;

a prescribed translation acquiring step of providing the second terminal with individual specific translated messages having been registered in the specific translation registering section in a referable manner, and acquiring a prescribed translated message, translated into a prescribed language, sent from the second terminal; and a prescribed translation registering step of sequentially registering prescribed translated messages acquired by the prescribed translation acquiring section into the database in association with specific translated messages to be translated.

To achieve the objects, according to the seventh aspect of the invention, there is provided a computer data signal embedded in a carrier wave, representing a program for controlling a computer to execute:

an original registering step of sequentially registering a plurality of original messages to be translated into the database;

a specific translation acquiring step of providing the first terminal with individual original messages having been registered in the original registering section in a referable manner, and acquiring a specific translated message, translated into a specific language, sent from the first terminal;

a specific translation registering step of sequentially registering specific translated messages acquired by the specific translation acquiring section into the database in association with the original messages to be translated;

a prescribed translation acquiring step of providing the second terminal with individual specific translated messages having been registered in the specific translation registering section in a referable manner, and acquiring a prescribed translated message, translated into a prescribed language, sent from the second terminal; and a prescribed translation registering step of sequentially registering prescribed translated messages acquired by the prescribed translation acquiring section into the database in association with specific translated messages to be translated.

BRIEF DESCRIPTION OF THE DRAWINGS

These objects and other objects and advantages of the present invention will become more apparent upon reading of the following detailed description and the accompanying drawings in which:

FIG. 6 is an exemplary diagram showing one example of a translation edition screen;

FIG. 7 is an exemplary diagram showing one example of a progress display screen;

FIG. 8 is an exemplary diagram showing one example of a retrieval screen;

DETAILED DESCRIPTION OF THE PREFERRED EMBODIMENT

A translation support system according to one embodiment of the invention will be described below with reference to the accompanying drawings. The translation support system supports a sequence of translation works of translating one language to a plurality of languages step by step. The following will describe, as one example of translation, a case of translating messages for an OA apparatus (messages to be displayed on a display section). The translation support system supports a sequence of translation works of translating a Japanese message (original language or original text) into an English message (equivalent or translation) first, then translating the English message to other foreign language messages or multilingual messages (individual equivalent or translated texts).

Figure 1:
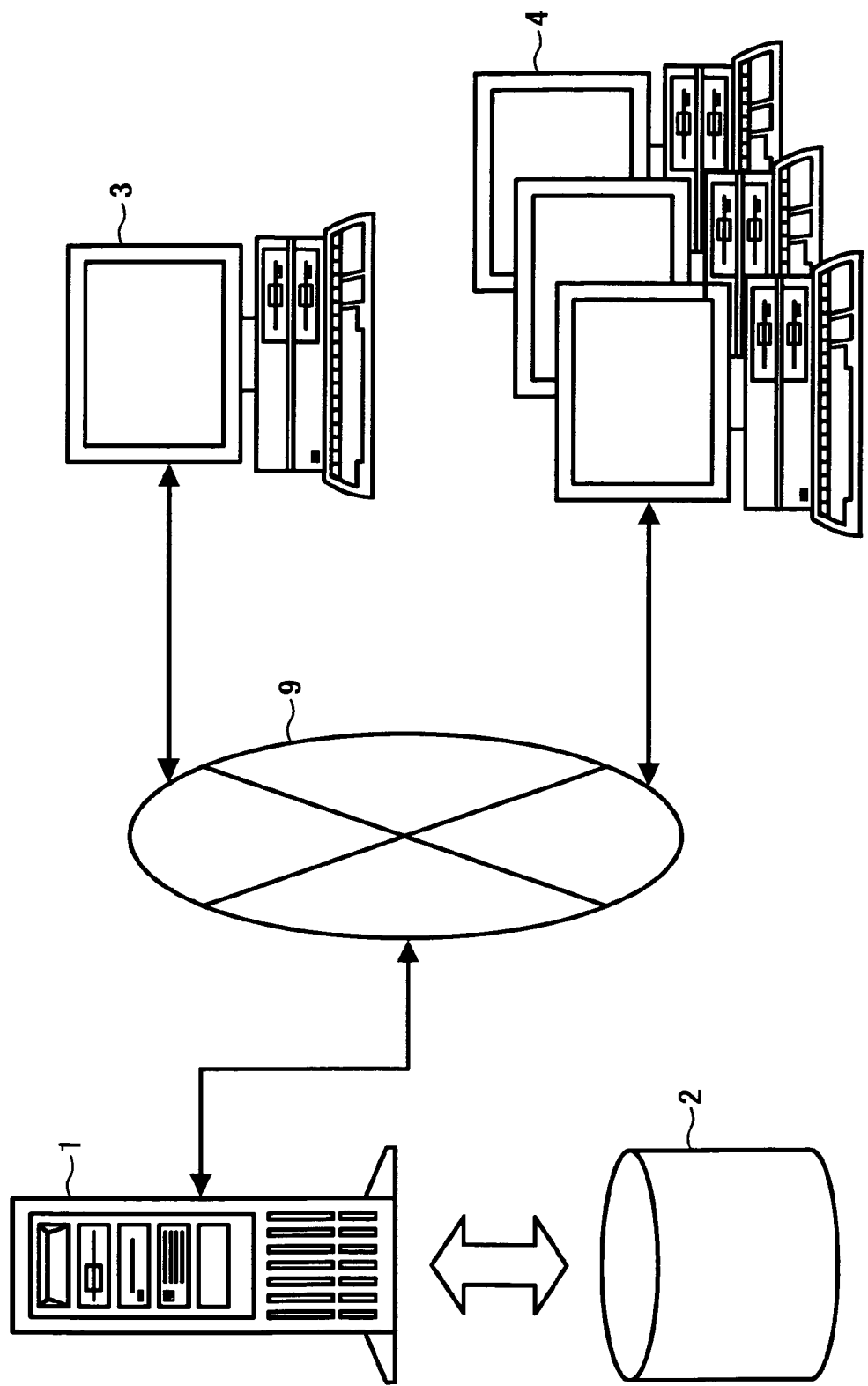
FIG. 1 is an exemplary diagram showing one example of the structure of a translation support system according to one embodiment of the invention.

FIG. 1 is a block diagram showing one example of the structure of a translation support system adapted to the embodiment of the invention. As illustrated, the translation support system comprises a server 1, a database 2, a translation terminal 3 and a plurality of translation terminals 4, and the server 1 is connected to the translation terminal 3 and the translation terminals 4 via an Internet 9.

The server 1 sequentially registers a plurality of Japanese messages to be translated (a plurality of messages to be discussed later, which are separated theme by theme). In parallel to the registration, the server 1 provides the translation terminal 3 with Japanese messages already registered, acquires English messages translated by the translation terminal 3, and sequentially registers the acquired English messages in the database 2 in association with corresponding Japanese messages. In parallel to the processes, the server 1 provides the individual translation terminals 4 with English messages already registered, acquires multilingual messages translated by the translation terminals 4, and sequentially registers the acquired multilingual messages in the database in association with corresponding English messages.

Each of the translation terminal 3 and the translation terminals 4 comprises a personal computer or the like which is communicatable with the server 1 over the Internet 9.

The translation terminal 3, which is used by a translator who translates Japanese to English, accesses the server 1 and displays Japanese messages registered in the database 2. The translation terminal 3 sends English messages input by the translator (English messages translated from the Japanese messages to be translated) to the server 1.

Each of the translation terminals 4, which are used by translators who translate English to other foreign languages (i.e., multiple languages) respectively, accesses the server 1 and displays English messages registered in the database 2. The translation terminals 4 send multilingual messages input by the associated translators (messages in foreign languages other than English translated from the English messages to be translated) to the server 1.

Figure 2:
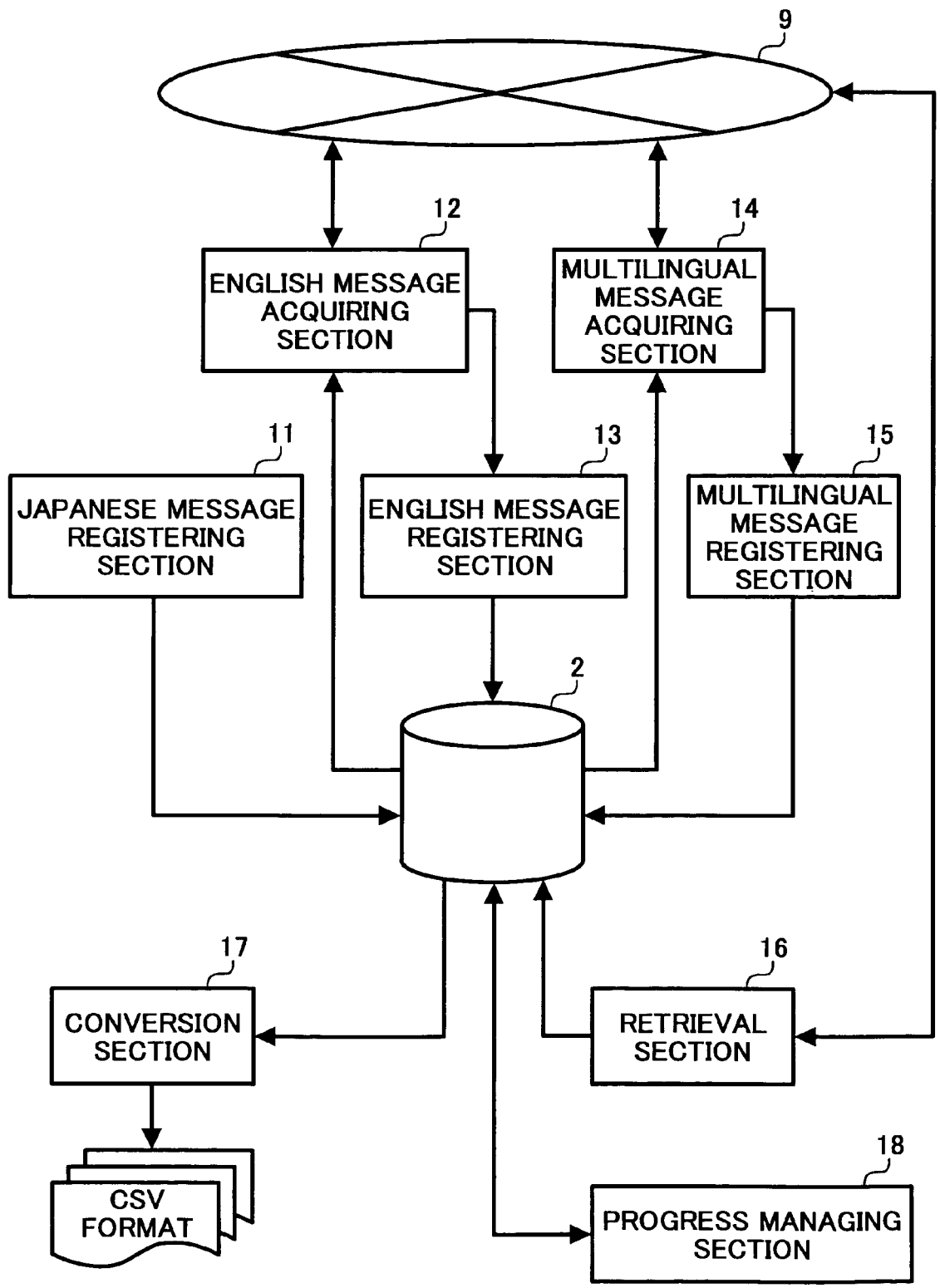
FIG. 2 is a block diagram showing one example of the structure of a server.

Referring to FIG. 2, the detailed description of the structure of the server 1 will be given below. FIG. 2 is a block diagram showing one example of the structure of the server 1. As illustrated, the server 1 comprises a Japanese message registering section 11, an English message acquiring section 12, an English message registering section 13, a multilingual message acquiring section 14, a multilingual message registering section 15, a retrieval section 16, a conversion section 17, and a progress managing section 18.

The Japanese message registering section 11 sequentially registers a plurality of Japanese messages to be translated (original messages) into the database 2.

For instance, the Japanese message registering section 11 sequentially reads Japanese messages in a list form generated by a terminal capable of executing a predetermined spreadsheet application and registers them into the database 2.

The Japanese messages to be translated are separated theme by theme (e.g., for each type of OA apparatuses). When a theme is a copy machine, for example, the theme includes various messages necessary to explain the manipulation and operation of a copy machine.

The English message acquiring section 12 supplies the registered Japanese messages to the translation terminal 3 over the Internet 9 in a referable manner, and acquires English messages (specific translated messages) sent from the translation terminal 3.

That is, the English message acquiring section 12 sequentially provides the translation terminal 3 with Japanese messages already registered, without waiting for registration of all the Japanese messages in the database 2. An English translator who uses the translation terminal 3 translates Japanese messages displayed on the translation terminal 3 and inputs translated English messages. Then, the English message acquiring section 12 acquires the English messages translated this way from the translation terminal 3.

The English message registering section 13 sequentially registers the English messages, acquired by the English message acquiring section 12, into the database 2 in association with the Japanese messages to be translated.

The English message registering section 13 computes the maximum number of characters defined according to the type or so of messages, and checks if each English message exceeds the maximum number of characters. In other words, there is a length restriction due to the size of the display area or so at the time a message is displayed on the display section of an OA apparatus. The English message registering section 13 therefore checks number of characters (number of bytes or so) so that the English message is adequately displayed on the display section.

When the English message exceeds the maximum number of characters, the English message registering section 13 requests the translator to resend a shorter English message through the translation terminal 3.

The multilingual message acquiring section 14 supplies the registered English messages to the translation terminal 3 over the Internet 9 in a referable manner, and acquires multilingual messages (prescribed translated messages) sent from the translation terminals 4.

That is, the multilingual message acquiring section 14 sequentially provides the translation terminals 4 with English messages already registered, without waiting for registration of all the English messages in the database 2. Each translator who uses the associated translation terminal 4 translates English messages displayed on the translation terminal 4 and inputs translated multilingual messages. Then, the multilingual message acquiring section 14 acquires the multilingual messages translated this way from the individual translation terminals 4.

The multilingual message registering section 15 sequentially registers the multilingual messages, acquired by the multilingual message acquiring section 14, into the database 2 in association with the English messages to be translated.

The multilingual message registering section 15 computes the maximum number of characters defined according to the type of messages, and checks if each multilingual message exceeds the maximum number of characters. When the multilingual message exceeds the maximum number of characters, the multilingual message registering section 15 requests the associated translator to resend a shorter multilingual message through the associated translation terminal 4.

In response to a retrieval request sent from the translation terminal 3 or each translation terminal 4, the retrieval section 16 searches the database 2.

When the translation terminal 3 requests retrieval of messages containing a prescribed word (English word), for example, the retrieval section 16 retrieves English messages containing the word from the database 2. When any target English message is found, the retrieval section 16 generates reference data including a Japanese message associated with the English message, and sends the reference data to the translation terminal 3.

Likewise, when any translation terminal 4 requests retrieval of messages containing a prescribed word, the retrieval section 16 retrieves multilingual messages containing the word from the database 2, generates reference data together with the associated English message, and sends the reference data to the translation terminal 4.

That is, the retrieval section 16 retrieves a set of a Japanese message and an English message or a set of an English message and a multilingual message, and sends reference data containing both retrieved messages to the requesting translation terminal 3 or 4.

The conversion section 17 converts a Japanese message, an English message and a multilingual message, which have been registered, to a predetermined format that can be input to an OA apparatus. For example, the conversion section 17 converts each message to the CSV format.

The progress managing section 18 tallies the Japanese messages, English messages and multilingual messages registered in the database 2, and manages the translation progress status of each language or a sequence of translations (the entire translation).

Figure 3:
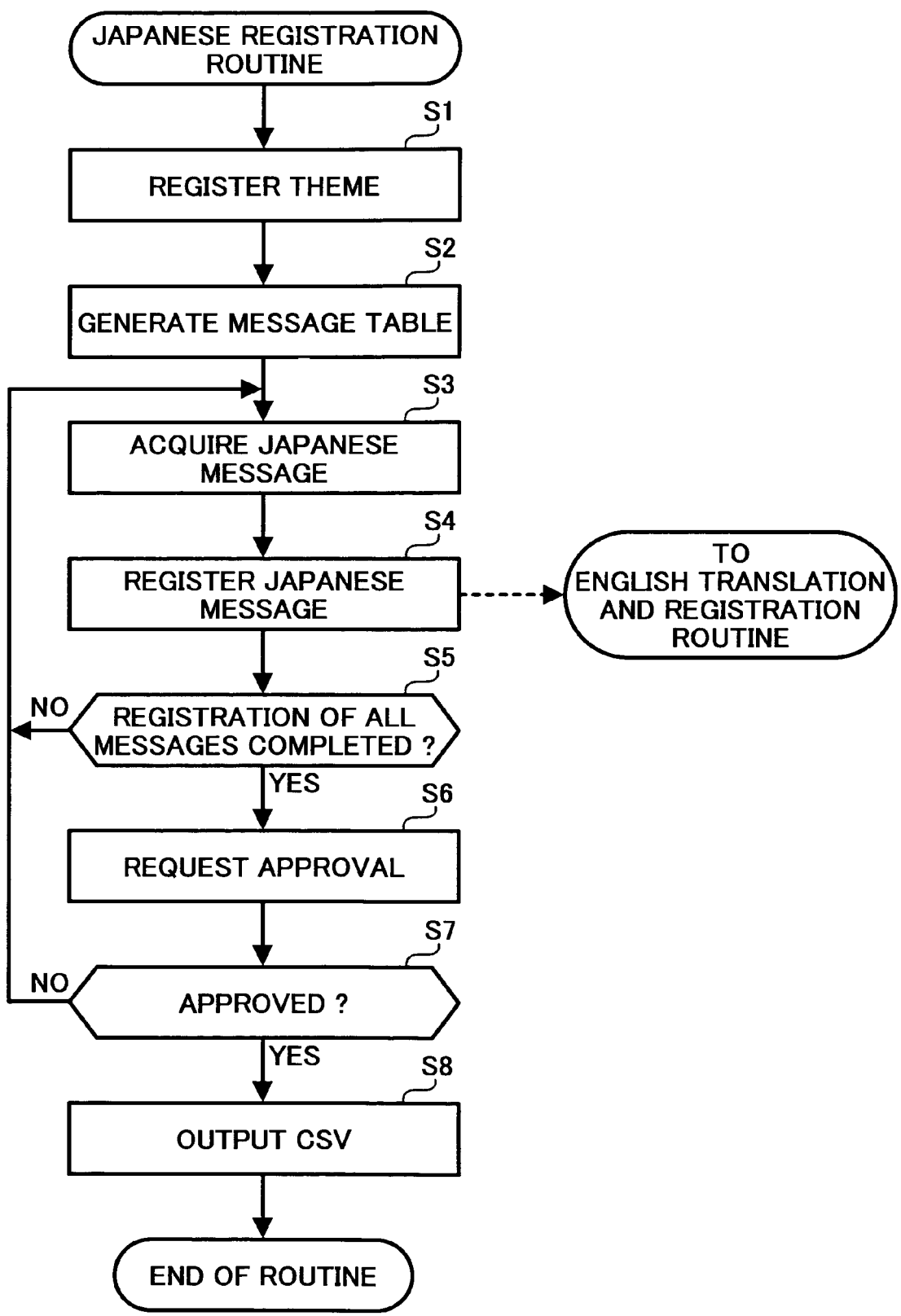
FIG. 3 is a flowchart for explaining a Japanese registration routine according to the embodiment of the invention.
Figure 4A:
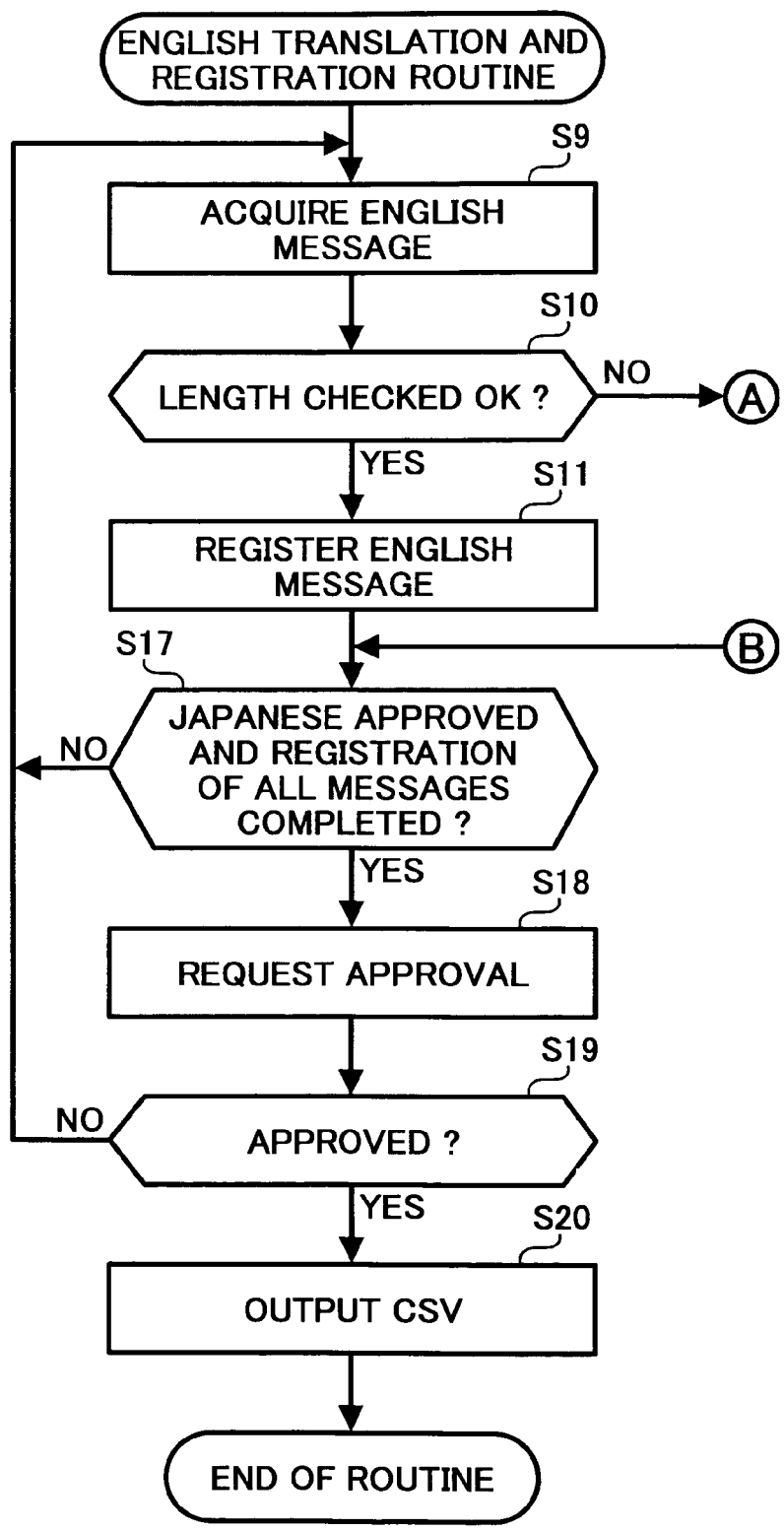
FIG. 4 is a flowchart for explaining an English translation and registration routine according to the embodiment of the invention.
Figure 4B:
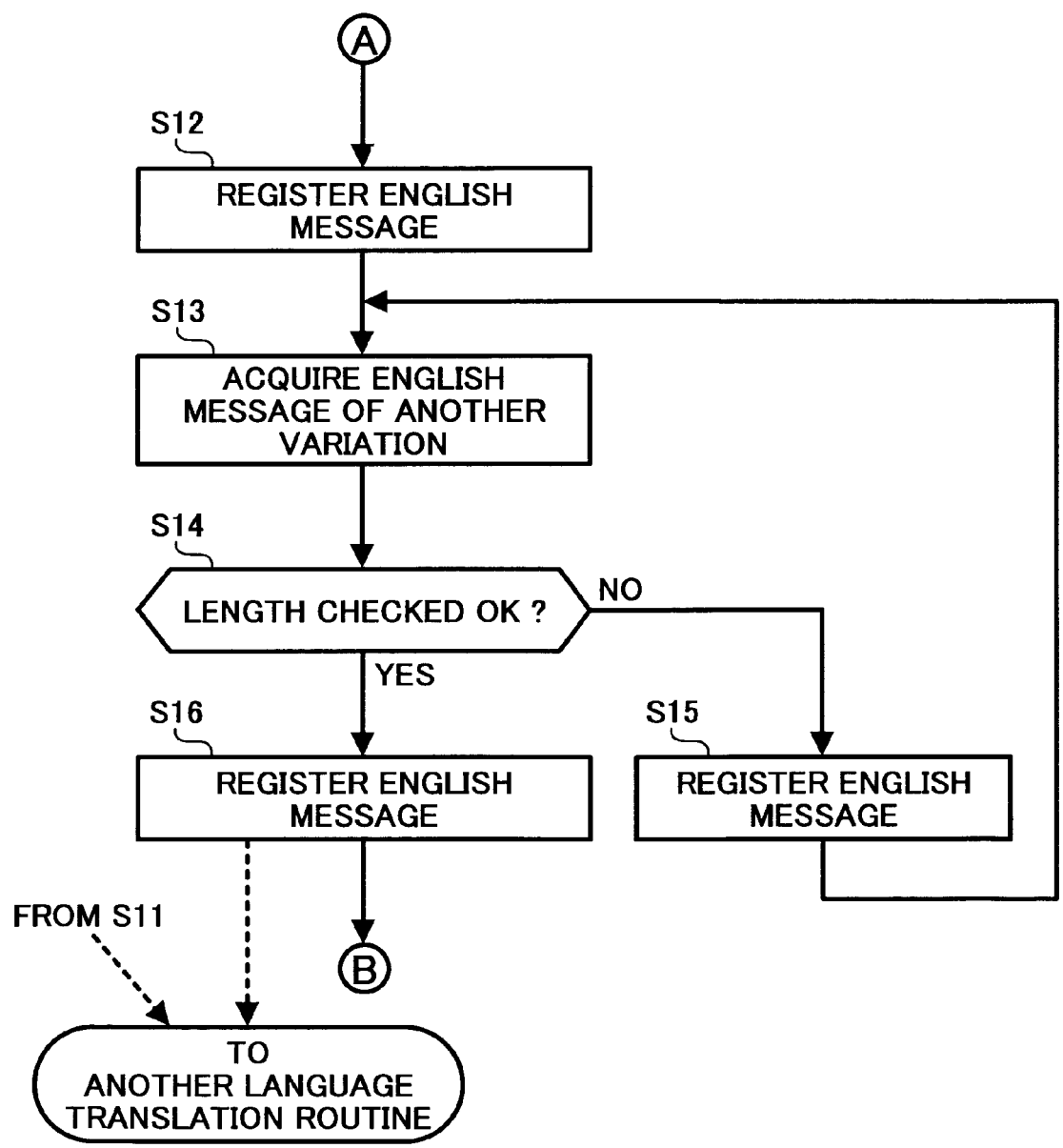
Figure 5A:
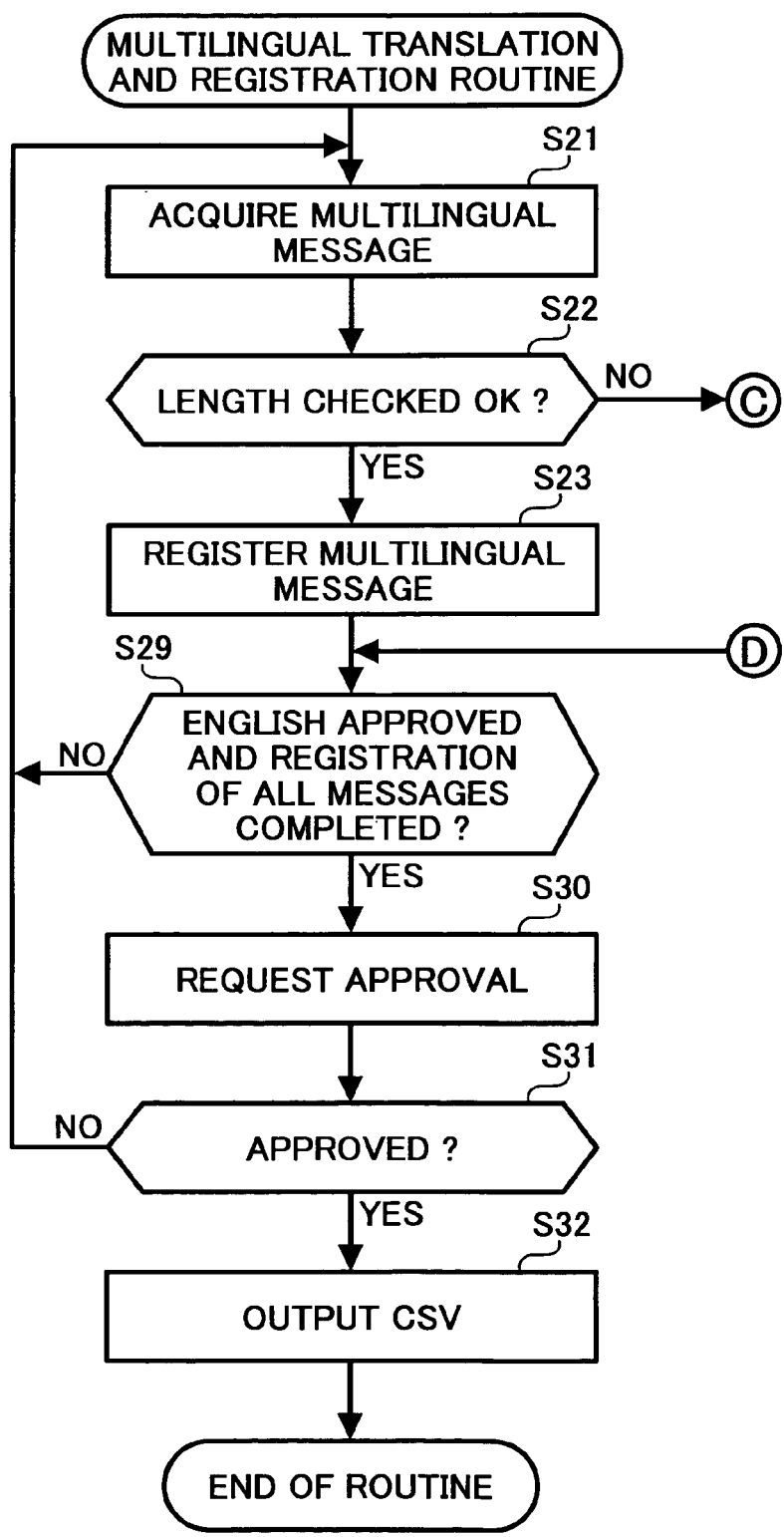
FIG. 5 is a flowchart for explaining a multilingual translation and registration routine according to the embodiment of the invention.
Figure 5B:
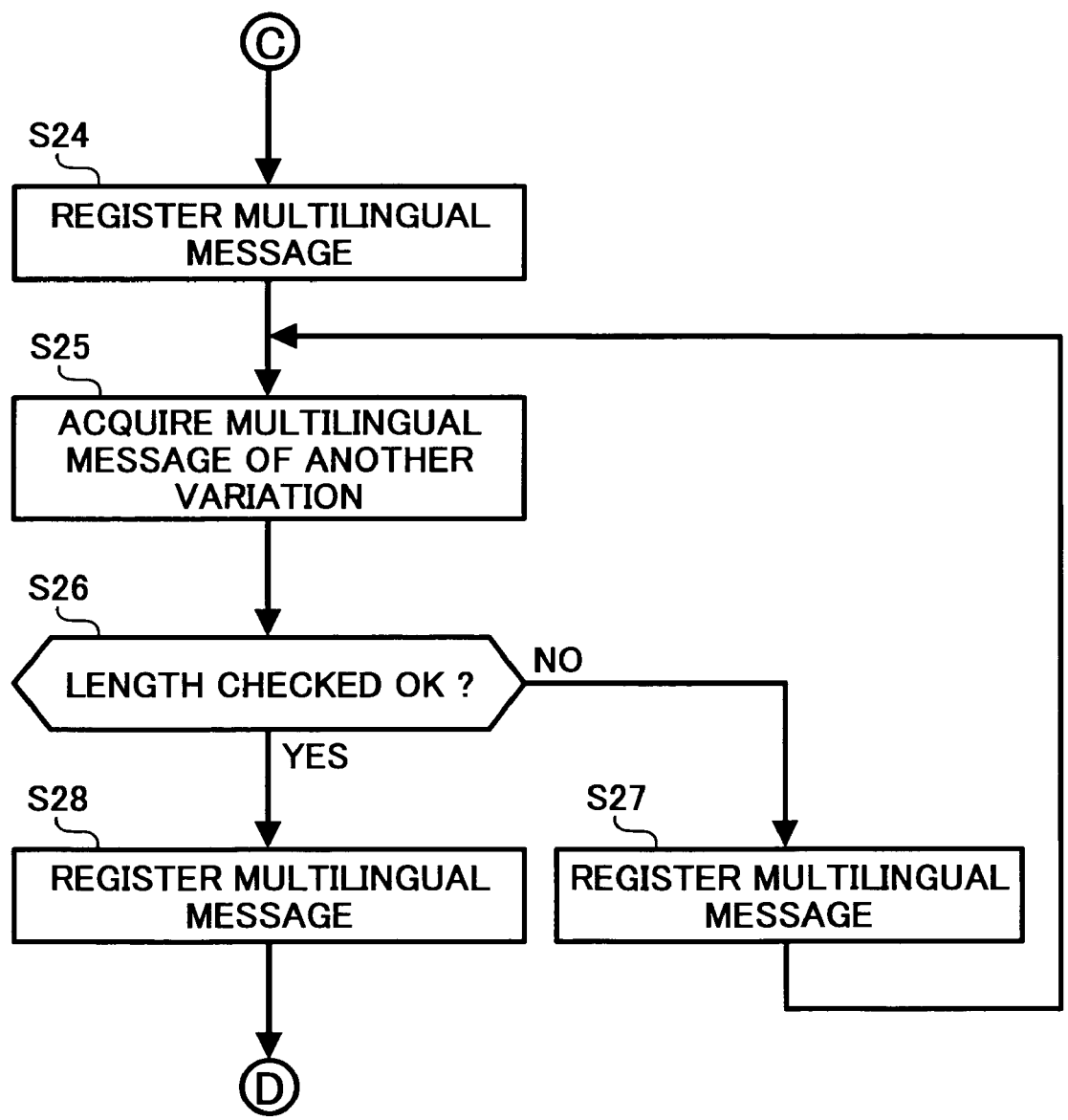

The operation of the translation support system according to the embodiment will be discussed referring to FIGS. 3 to 5. FIG. 3 is a flowchart for explaining a Japanese registration routine which is executed by the server 1. FIG. 4 is a flowchart for explaining an English translation and registration routine which is executed by the server 1. FIG. 5 is a flowchart for explaining a multilingual translation and registration routine which is executed by the server 1.

The English translation and registration routine in FIG. 4 is executed in parallel to execution of the Japanese registration routine in FIG. 3 (after registration of Japanese messages). The multilingual translation and registration routine in FIG. 5 is executed in parallel to execution of the English translation and registration routine in FIG. 4 (after registration of English messages).

To begin with, the Japanese registration routine will be discussed referring to FIG. 3.

First, the server 1 registers a theme to determine an OA apparatus for which translation is to be done (step S1). A machine type or a machine number to identify an OA apparatus, for example, is used as the theme, and is registered as the theme. Thereafter, translation or so of messages of a manipulation or operation description or the like which are needed for the machine type or the like (theme) is carried out.

The server 1 prepares a message table for storing various messages according to the theme (step S2). For instance, the server 1 generates as many message tables as necessary to store English messages and multilingual messages in association with the number of messages needed in translation.

The server 1 acquires a Japanese message generated (step S3). That is, the server 1 acquires a Japanese message to be translated. The server 1 also inputs a display address (start coordinates and end coordinates) and information on a character font which are needed at the time of displaying the message. The display address and the font information are used in computing the maximum number of characters (number of bytes) based on which the number of characters in a message is checked.

The server 1 registers the input Japanese message into the database 2 (step S4). The Japanese message registered in the database 2 is referable by the translation terminal 3, and the English translation and registration routine to be discussed later are started in parallel.

The server 1 discriminates whether registration of all the Japanese messages has been completed or not (step S5). That is, the server 1 discriminates if registration of all the Japanese messages according to the theme has been completed.

When discriminating that registration of all the Japanese messages has not been completed, the server 1 returns to the process of step S3, and repeats the sequence of processes of steps S3 to S5.

When discriminating that registration of all the Japanese messages has been completed, on the other hand, the server 1 requests approval of the Japanese messages (step S6). For example, the server 1 sends all the Japanese messages registered to the terminal of the approver and request approval.

The server 1 discriminates whether the Japanese messages have been approved or not (step S7). When discriminating that the Japanese messages have not been approved, the server 1 returns to the process of step S3, and repeats the sequence of processes of steps S3 to S7.

When discriminating that the Japanese messages have been approved, the server 1 converts the Japanese messages to the CSV format and outputs the resultant messages (step S8). Then, the server 1 terminates the Japanese registration routine.

Referring now to FIG. 4, the English translation and registration routine will be discussed. The English translation and registration routine is executed in parallel to execution of the Japanese registration routine in FIG. 3.

First, the server 1 provides the translation terminal 3 with Japanese messages registered in the database 2, and acquires translated English messages (step S9). That is, the translator who uses the translation terminal 3 translates a Japanese message to an English message. When the translated English message is input at the translation terminal 3, the server 1 acquires the English message.

The server 1 computes the maximum number of characters displayable, and discriminates whether the acquired English message exceeds the maximum number of characters or not (step S10).

When discriminating that the acquired English message does not exceed the maximum number of characters, the server 1 registers the acquired English message into the database 2 in association with the corresponding Japanese message (step S11). The English message registered in the database 2 is referable by each translation terminal 4, and the multilingual translation and registration routine to be discussed later are started in parallel.

When discriminating that the acquired English message exceeds the maximum number of characters, on the other hand, the server 1 registers the English message into the database 2 (step S12), and requests a shorter English message and acquires an English message of another variation from the translation terminal 3 (step S13).

The server 1 checks the number of characters (step S14). When the number of characters exceeds the maximum number of characters, the server 1 registers the English message (step S15), and then returns to the process of step S13. When discriminating that the number of characters does not exceed the maximum number of characters, on the other hand, the server 1 registers the acquired English message into the database 2 in association with the corresponding Japanese message (step S16). The English message registered in the database 2 referable by each translation terminal 4, and the multilingual translation and registration routine to be discussed later are started in parallel.

The server 1 discriminates whether the Japanese messages have been approved and registration of all the English messages has been completed or not (step S17). That is, the server 1 discriminates whether the Japanese messages to be translated have been approved and registration of all the English messages corresponding to all the Japanese messages has been completed or not.

When discriminating that registration of all the English messages has not been completed (the Japanese messages have not been approved), the server 1 returns to the process of step S9, and repeats the sequence of processes of steps S9 to S17.

When discriminating that the Japanese messages have been approved and registration of all the English messages has been completed, on the other hand, the server 1 requests approval of the English messages (step S18), and discriminates whether the English messages have been approved or not (step S19). When discriminating that the English messages have not been approved, the server 1 returns to the process of step S9, and repeats the sequence of processes of steps S9 to S19.

When discriminating that the English messages have been approved, on the other hand, the server 1 converts the English messages to the CSV format and outputs the resultant messages (step S20). Then, the server 1 terminates the English translation and registration routine.

Referring to FIG. 5, the multilingual translation and registration routine will be discussed below. The multilingual translation and registration routine is executed in parallel to execution of the above-described English translation and registration routine in FIG. 4.

First, the server 1 provides each translation terminal 4 with English messages registered in the database 2, and acquires translated multilingual messages (step S21). That is, the translators who use the translation terminals 4 translate an English message to messages in other languages than English (multilingual messages). When the translated multilingual message is input at each translation terminal 4, the server 1 acquires the multilingual message.

The server 1 discriminates whether the acquired multilingual message exceeds the maximum number of characters or not (step S22). When discriminating that the acquired multilingual message does not exceed the maximum number of characters, the server 1 registers the acquired multilingual message into the database 2 in association with the corresponding English message (step S23).

When discriminating that the acquired multilingual message exceeds the maximum number of characters, on the other hand, the server 1 registers the multilingual message into the database 2 (step S24), and requests a shorter multilingual message and acquires a multilingual message of another variation from each translation terminal 4 (step S25).

The server 1 checks the number of characters (step 26). When the number of characters exceeds the maximum number of characters, the server 1 registers the multilingual message (step S27), and then returns to the process of step S25. When discriminating that the number of characters does not exceed the maximum number of characters, on the other hand, the server 1 registers the acquired multilingual message into the database 2 in association with the corresponding English message (step S28).

The server 1 discriminates whether the English messages have been approved and registration of all the multilingual messages has been completed or not (step S29). That is, the server 1 discriminates whether the English messages to be translated have been approved (on the premise that the Japanese messages have been approved) and registration of all the multilingual messages corresponding to all the English messages has been completed or not.

When discriminating that registration of all the multilingual messages has not been completed (the English messages have not been approved), the server 1 returns to the process of step S21, and repeats the sequence of processes of steps S21 to S31.

When discriminating that the English messages have been approved and registration of all the multilingual messages has been completed, on the other hand, the server 1 requests approval of the multilingual messages (step S30), and discriminates whether the multilingual message shave been approved or not (step S31). When discriminating that the multilingual messages have not been approved, the server 1 returns to the process of step S21, and repeats the sequence of processes of steps S21 to S31.

When discriminating that the English messages have been approved, on the other hand, the server 1 converts the multilingual messages to the CSV format and outputs the resultant messages (step S32). Then, the server 1 terminates the multilingual translation and registration routine.

As the Japanese registration routine, the English translation and registration routine, and the multilingual translation and registration routine are executed in parallel, a sequence of translation works is carried out smoothly and quickly. Conventionally, translation from Japanese into English would take one month, and translation from English to multiple languages would take three months, so that a total of four months were needed for the entire translation work. The translation support system according to the invention, by way of contrast, can shorten the entire translation work and finish translation in about 40 days.

Further, the translation support system of the invention checks the maximum number of characters (the number of bytes) during a translation work, thus eliminating a correcting work.

Referring to FIGS. 6 to 8, the following will described specific works done by translators who use the translation terminals 3 and 4.

FIG. 6 is an exemplary diagram showing one example of a translation edition screen which is displayed on the translation terminal 3 or so. As illustrated, the translation edition screen includes areas 61 to 65.

The area 61 displays a system ID. The area 62 displays a Japanese message to be translated. The area 63 displays an English message input by a translator.

The area 64 displays a terminology indicative of the meaning of a Japanese message. The area 65 displays the maximum number of characters (number of bytes).

Through the translation edition screen, the translator who uses the translation terminal 3 performs a translation work. That is, at the time of translating a Japanese message displayed in the area 62, the translator can translate the Japanese message more adequately referring to the terminology displayed in the area 64. The translator also translates the Japanese message into an English message of the adequate number of characters by referring to the maximum number of characters displayed in the area 64. When the English message translated this way is input, it is displayed in the area 63.

FIG. 7 is an exemplary diagram showing one example of a progress display screen which is displayed on the translation terminal 3 or so. As illustrated, the progress display screen includes areas 71 to 75 (button 74).

The area 71 displays a selected theme (the machine type of an OA apparatus). The area 72 displays the version of the theme (OA apparatus). The area 73 displays a selected function field. When the button 74 is clicked, a list 75 showing the progress statuses of translation to individual languages is displayed. The total number of messages to be translated (100 in this example) is displayed in an area 75n in the margin.

The list 75 includes a language 75a, a number of translations 75b, a number of untranslated cases 75c, a progress ratio 75d, a translation due date 75e, a scheduled release date 75f, a status 75g, and a list of untranslated words 75h.

Through the progress display screen, the translator can easily grasp the progress status of translation to each language.

FIG. 8 is an exemplary diagram showing one example of a retrieval screen which is displayed on the translation terminal 3 or so. As illustrated, the retrieval screen includes areas 81 to 90 (check box 87 and button 89).

The area 81 displays a selected theme (the machine type of an OA apparatus). The area 82 displays a selected function field. The area 83 displays a selected language. A word or a sequence of characters to be translated is input to the area 84. A term ID is input in the area 85, and a system ID is input to the area 86.

The status of a term (untranslated, in translation/edition, in examination/approval process, and released) is checked in the check box 87.

The number of page to be displayed is input to the area 88.

When the button 89 is clicked, a list 90 of terms which match with the condition showing the progress statuses of translation to individual languages is displayed. The number of cases to be displayed (20 in this example) is displayed in an area 90n in the margin.

The list 90 includes a term ID 90a, a system ID 90b, a term status 90c, a language 90d, a variation 90e, Fix 90f, a terminology 90g, an update date 90h, and an edition 90i.

When the edition 90i is clicked, the screen is shifted to the translation edition screen in FIG. 6.

Through the retrieval screen, messages already translated can be retrieved, thereby preventing double translation or so.

Figure 9:
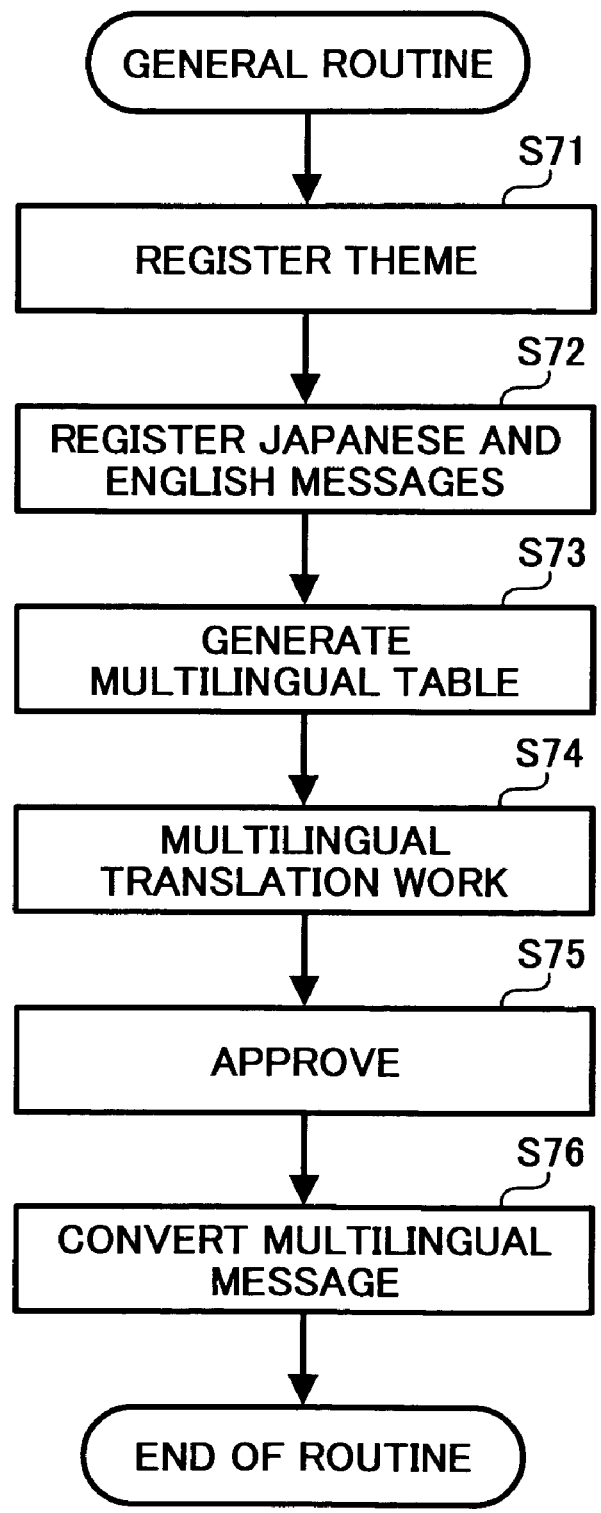
FIG. 9 is a flowchart for explaining the general routine.
Figure 10:
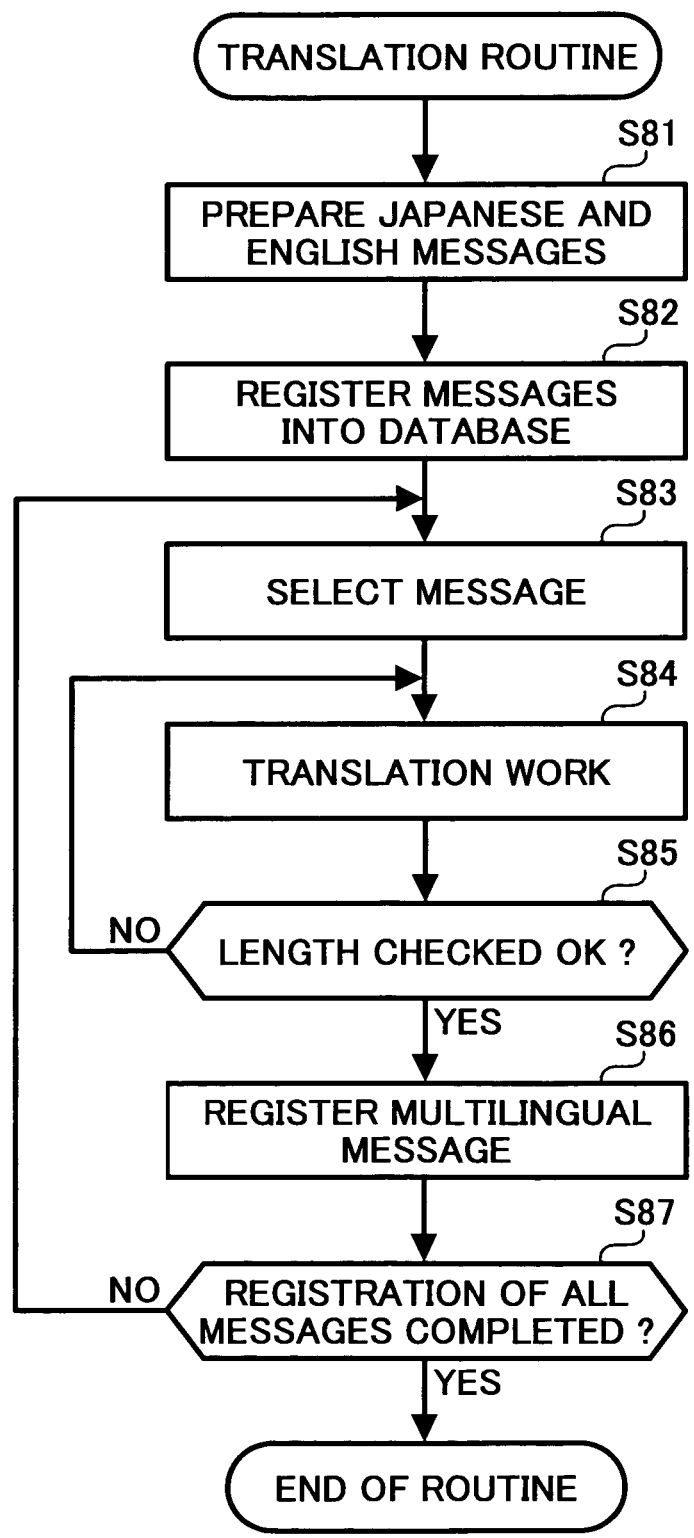
FIG. 10 is a flowchart for explaining a translation routine.

Referring to FIGS. 9 and 10, the overall process flow of the translation support system according to the invention will be described. FIG. 9 is a flowchart for explaining the general routine, and FIG. 10 is a flowchart for explaining a translation routine.

As shown in FIG. 9, first, a theme is registered (step S71), and a Japanese message and an English message are registered (step S72). Then, a multilingual table is created (step S73), and a multilingual translation work is executed (step S74).

As the multilingual message translated is approved (step S75), the multilingual message is converted to the CSV format (step S76).

As shown in FIG. 10, first, Japanese messages and English messages are prepared together with a terminology (step S81), and are registered in the database 2 (step S82). As the translator selects an arbitrary English message (step S83), translation of the English message to a multilingual message is executed (step S84).

The number of characters in the multilingual message is checked (step S85), and when the multilingual message exceeds the maximum number of characters, the translation work at step S84 is repeated. Then, the checked multilingual message is registered in the database 2 (step S86).

The sequence of processes of steps S83 to S87 is repeated until completion of registration of all the multilingual messages is checked (step S87) and checked OK.

As apparent from the above, the translation support system of the invention can adequately support a series of translation works.

Although a Japanese message is translated into an English message which is then translated into multilingual messages in the foregoing description of the embodiment, those languages are just one example of the source language and languages to be translated, and the translation support system can be adapted to translation among arbitrary languages as needed.

Although the server 1 is connected to the translation terminals 3 and 4 over the Internet 9 in the foregoing description of the embodiment, the network that connects those components is not fixed.

For example, the server 1 may be connected to the translation terminals 3 and 4 by an LAN or the like.

The translation support system of the invention can be realized by an ordinary computer. For example, the system can be achieved by recording a program and data for allowing a computer to execute the above-described processes in a recording medium (FD, CD-ROM, DVD or the like) to be distributed, installing the program and data on an OS, and running the program. The program and data may be stored in a disk drive or the like in a server unit located on the Internet, and may be superimposed on a carrier wave, which is in turn downloaded to a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-119228 filed on Apr. 14, 2004 and including specification, claims, drawings and summary. The disclosure of the above Japanese Patent Application is incorporated herein by reference in its entirety.

What is claimed is:

1. A translation support system concerning a plurality of languages in which a server having a database, a first translation terminal and a second translation terminal are connected together via a predetermined network, and said server comprises:

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein a plurality of second translation terminals are each connected to said server, said first translation terminal displays an original message supplied from said server and transmits a first translated message translated into a first language to said server, said second translation terminal displays a first translated message supplied from said server and transmits a second translated message translated into a second language to said server, and said first translation acquiring section provides said second translation terminals with respective registered first translated messages in a referable manner, and acquires second translated messages, translated into different languages, sent from said second translation terminals.

2. A translation support system concerning a plurality of languages in which a server having a database, a first translation terminal and a second translation terminal are connected together via a predetermined network, and said server comprises:

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein said first translation terminal displays an original message supplied from said server and transmits a first translated message translated into a first language to said server, said second translation terminal displays a first translated message supplied from said server and transmits a second translated message translated into a second language to said server, said original registering section adds meaning data indicative of a meaning of an original message to said original message, and registers said meaning-data added original message in said database, and said first translation registering section adds meaning data indicative of a meaning of a first translated message to said first translated message, and registers said meaning-data added first translated message in said database.

3. A translation support system concerning a plurality of languages in which a server having a database, a first translation terminal and a second translation terminal are connected together via a predetermined network, and said server comprises:

an original registering section which sequentially registers a plurality of original messages to be translated into said database;

a first translation acquiring section which provides said first translation terminal with individual original messages having been registered in said original registering section in a referable manner, and acquires a first translated message, translated into a first language sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein said first translation terminal displays an original message supplied from said server and transmits a first translated message translated into a first language to said server, said second translation terminal displays a first translated message supplied from said server and transmits a second translated message translated into a second language to said server, said first translation acquiring section computes the maximum number of characters defined according to a display section for displaying a message, and requests said first translation terminal to resend a shorter first translated message when a first translated message sent from said first translation terminal is longer than said computed maximum number of characters, and said second translation acquiring section computes the maximum number of characters defined according to a display section for displaying a message, and requests said second translation terminal to resend a shorter second translated message when a second translated message sent from said second translation terminal is longer than said computed maximum number of characters.

4. A translation support system concerning a plurality of languages in which a server having a database, a first translation terminal and a second translation terminal are connected together via a predetermined network, and said server comprises:
- an original registering section which sequentially registers a plurality of original messages to be translated into said database;
- a first translation acquiring section which provides said first translation terminal with individual original messages having been registered in said original registering section in a referable manner, and acquires a first translated message, translated into a first language, sent from said first translation terminal;
- a first translation registering section which sequentially registers first translated messages acquired by said first translation acquiring section into said database in association with said original messages to be translated;
- a second translation acquiring section which provides said second translation terminal with individual first translated messages having been registered in said first translation registering section in a referable manner, and acquires a second translated message, translated into a second language, sent from said second translation terminal; and
- a second translation registering section which sequentially registers second translated messages acquired by said second translation acquiring section into said database in association with first translated messages to be translated,
- wherein said first translation terminal displays an original message supplied from said server and transmits a first translated message translated into a first language to said server,
- said second translation terminal displays a first translated message supplied from said server and transmits a second translated message translated into a second language to said server, and
- said server further comprises a retrieval section which retrieves a set of an original message and a first translated message or a set of a first translated message and a second translated message from said database in response to a retrieval request sent from said first translation terminal or said second translation terminal, and sends reference data including both messages retrieved to said first translation terminal or said second translation terminal whichever has requested retrieval.

5. A translation support system concerning a plurality of languages in which a server having a database, a first translation terminal and a second translation terminal are connected together via a predetermined network, and said server comprises:
- an original registering section which sequentially registers a plurality of original messages to be translated into said database;
- a first translation acquiring section which provides said first translation terminal with individual original messages having been registered in said original registering section in a referable manner, and acquires a first translated message, translated into a first language, sent from said first translation terminal;
- a first translation registering section which sequentially registers first translated messages acquired by said first translation acquiring section into said database in association with said original messages to be translated;
- a second translation acquiring section which provides said second translation terminal with individual first translated messages having been registered in said first translation registering section in a referable manner, and acquires a second translated message, translated into a second language, sent from said second translation terminal; and
- a second translation registering section which sequentially registers second translated messages acquired by said second translation acquiring section into said database in association with first translated messages to be translated,
- wherein said first translation terminal displays an original message supplied from said server and transmits a first translated message translated into a first language to said server,
- said second translation terminal displays a first translated message supplied from said server and transmits a second translated message translated into a second language to said server, and
- said server further comprises a conversion section which converts messages, registered in said database by said original registering section, said first translation registering section and said second translation registering section, into predetermined formats.

6. A translation support system concerning a plurality of languages in which a server having a database, a first translation terminal and a second translation terminal are connected together via a predetermined network, and said server comprises:
- an original registering section which sequentially registers a plurality of original messages to be translated into said database;
- a first translation acquiring section which provides said first translation terminal with individual original messages having been registered in said original registering section in a referable manner, and acquires a first translated message, translated into a first language, sent from said first translation terminal;
- a first translation registering section which sequentially registers first translated messages acquired by said first translation acquiring section into said database in association with said original messages to be translated;
- a second translation acquiring section which provides said second translation terminal with individual first translated messages having been registered in said first translation registering section in a referable manner, and acquires a second translated message, translated into a second language, sent from said second translation terminal; and
- a second translation registering section which sequentially registers second translated messages acquired by said second translation acquiring section into said database in association with first translated messages to be translated,
- wherein said first translation terminal displays an original message supplied from said server and transmits a first translated message translated into a first language to said server,
- said second translation terminal displays a first translated message supplied from said server and transmits a second translated message translated into a second language to said server, and
- said server further comprises a progress managing section which counts numbers of messages respectively from said first translation registering section and said second translation registering section registered in said database, and manages a progress status of each translation or a progress status of a series of translations.

7. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein a plurality of second translation terminals are each connected to said server, and said first translation acquiring section provides said second translation terminals with respective registered first translated messages in a referable manner, and acquires second translated messages, translated into different languages, sent from said second translation terminals.

8. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein said original registering section adds meaning data indicative of a meaning of an original message to said original message, and registers said meaning-data added original message in said database, and said first translation registering section adds meaning data indicative of a meaning of a first translated message to said first translated message, and registers said meaning-data added first translated message in said database.

9. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein said first translation acquiring section computes the maximum number of characters defined according to a display section for displaying a message, and requests said first translation terminal to resend a shorter first translated message when a first translated message sent from said first translation terminal is longer than said computed maximum number of characters, and said second translation acquiring section computes the maximum number of characters defined according to a display section for displaying a message, and requests said second translation terminal to resend a shorter second translated message when a second translated message sent from said second translation terminal is longer than said computed maximum number of characters.

10. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein the server further comprises a retrieval section which retrieves a set of an original message and a first translated message or a set of a first translated message and a second translated message from said database in response to a retrieval request sent from said first translation terminal or said second translation terminal, and sends reference data including both messages retrieved to said first translation terminal or said second translation terminal whichever has requested retrieval.

11. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein the server further comprises a conversion section which converts messages, registered in said database by said original registering section, said first translation registering section and said second translation registering section, into predetermined formats.

12. A server, supporting translation into a plurality of languages, which is connected to a first translation terminal and a second translation terminal via a predetermined network, comprising:

a database;

an original registering section which sequentially registers a plurality of original messages to be translated into said database;

a first translation acquiring section which provides said first translation terminal with individual original messages having been registered in said original registering section in a referable manner, and acquires a first translated message, translated into a first language, sent from said first translation terminal;

a first translation registering section which sequentially registers first translated messages acquired by said first translation acquiring section into said database in association with said original messages to be translated;

a second translation acquiring section which provides said second translation terminal with individual first translated messages having been registered in said first translation registering section in a referable manner, and acquires a second translated message, translated into a second language, sent from said second translation terminal; and a second translation registering section which sequentially registers second translated messages acquired by said second translation acquiring section into said database in association with first translated messages to be translated, wherein the server further comprises a progress managing section which counts numbers of messages respectively from said first translation registering section and said second translation registering section registered in said database, and manages a progress status of each translation or a progress status of a series of translations.

* * * * *